(12) United States Patent
Hiroyuki (10) Patent No.: US 9,063,625 B2
(45) Date of Patent: Jun. 23, 2015

(54) ELECTRONIC DEVICE IMPLEMENTING A TOUCH PANEL DISPLAY UNIT

(71) Applicants: Hyundai Motor Company, Seoul (KR); Kia Motors Corporation, Seoul (KR); Hyundai Motor Japan R&D Center, Inc., Yokohama City (JP)

(72) Inventor: Kojima Hiroyuki, Kanagawa (JP)

(73) Assignees: Hyundai Motor Company, Seoul (KR); Kia Motors Corporation, Seoul (KR); Hyundai Motor Japan R&D Center Inc., Kanagawa (JP)

( * ) Notice: Subject to any disclaimer, the term of this patent is extended or adjusted under 35 U.S.C. 154(b) by 209 days.

(21) Appl. No.: 13/715,778

(22) Filed: Dec. 14, 2012

(65) Prior Publication Data

US 2014/0009434 A1 Jan. 9, 2014

(30) Foreign Application Priority Data

Jul. 6, 2012 (JP) ................................ 2012-152584

(51) Int. Cl.
*G06F 3/044* (2006.01)
*G06F 3/01* (2006.01)
*G06F 3/041* (2006.01)

(52) U.S. Cl.
CPC ................ *G06F 3/044* (2013.01); *G06F 3/016* (2013.01); *G06F 3/0414* (2013.01); *G06F 3/0418* (2013.01)

(58) Field of Classification Search
CPC ..... G06F 3/041; G06F 3/0414; G06F 3/0412; G06F 3/044; G06F 3/046; G06F 3/047
USPC ........ 178/18.03; 200/600; 313/581; 324/684; 340/384.1, 407.1; 345/156, 168, 173, 345/174, 204, 690; 349/145, 48; 455/566
See application file for complete search history.

(56) References Cited

U.S. PATENT DOCUMENTS

| | | | |
|---|---|---|---|
| 4,373,784 A * | 2/1983 | Nonomura et al. ........... | 349/145 |
| 2005/0030292 A1* | 2/2005 | Diederiks ..................... | 345/173 |
| 2010/0141407 A1* | 6/2010 | Heubel et al. ............... | 340/407.1 |
| 2011/0175845 A1* | 7/2011 | Honda et al. ................. | 345/174 |
| 2012/0086651 A1* | 4/2012 | Kwon et al. ................. | 345/173 |

FOREIGN PATENT DOCUMENTS

| | | |
|---|---|---|
| JP | 06250668 A | 9/1994 |
| JP | 2004333306 A | 11/2004 |
| JP | 2009116863 A | 5/2009 |
| KR | 10-2009-0004677 | 1/2009 |

(Continued)

*Primary Examiner* — Ariel Balaoing
*Assistant Examiner* — Sepehr Azari
(74) *Attorney, Agent, or Firm* — Mintz Levin Cohn Ferris Glovsky and Popeo, P.C.; Peter F. Corless (57) ABSTRACT

Provided is an electronic device that includes a touch panel configured to detect pressed coordinates and a pressing force from a change in capacitances, and a shape memory wire portion configured to restore its shape of shape memory wires by applying current through one or more shape memory wires of a first layer and a second layer accordingly. A display is configured to display a normal image and a corrected image. In addition, a processor is configured to provide a corrected image for a location of the touch panel which is currently being touched and to apply a current to the shape memory wire portion to restore the shape memory wire portion to an original shape.

10 Claims, 6 Drawing Sheets

(56) References Cited

FOREIGN PATENT DOCUMENTS

| KR | 10-2009-0082142 | 7/2009 |
| KR | 10-2009-0131638 | 12/2009 |
| KR | 10-2010-0046152 | 5/2010 |
| KR | 10-2011-0045800 | 5/2011 |

* cited by examiner

<A-A CROSS-SECTIONAL VIEW>

< TYPICAL STRUCTURE >

ELECTRONIC DEVICE IMPLEMENTING A TOUCH PANEL DISPLAY UNIT

CROSS-REFERENCE TO RELATED APPLICATION

This application claims under 35 U.S.C. §119(a) the benefit of Japanese Patent Application No. 2012-152584 filed on Jul. 6, 2012, the entire contents of which are incorporated herein by reference.

BACKGROUND (a) Technical Field

The present invention relates to an electronic device including a touch panel and a display, which is touch sensitive and is deformable by finger pressing manipulation.

(b) Background Art

Recently, mobile phones have begun to adopt touch screen technology in which the display also functions as an input. Such a function is implemented by applying an input means on top of the display panel called a touch panel. The touch panel is touch sensitive and recognizes when a user's, finger for example, comes in contact with the panel and inputs position information associated with the movement of the pen or finger across or on the touch panel. Redundant arrangement of buttons can be avoided and electronic devices having elegant designs can be provided due to the current state of the technology. However, since the touch panel is still flat, there is still no way to improve the sense of touch perceived by the user.

That is, unlike the normal keyboard of a desktop computer or the conventional type of a mobile phone where each alphabetic letter can be distinguished from another letter due to the presence of a certain projection/protrusion and/or between them and from the bottom surface, the surface of the touch panel is smooth surface without such projection/protrusion or a distinguishable partition. Therefore, it is not possible to improve the sense of touch perceived by a user.

Figure 7:
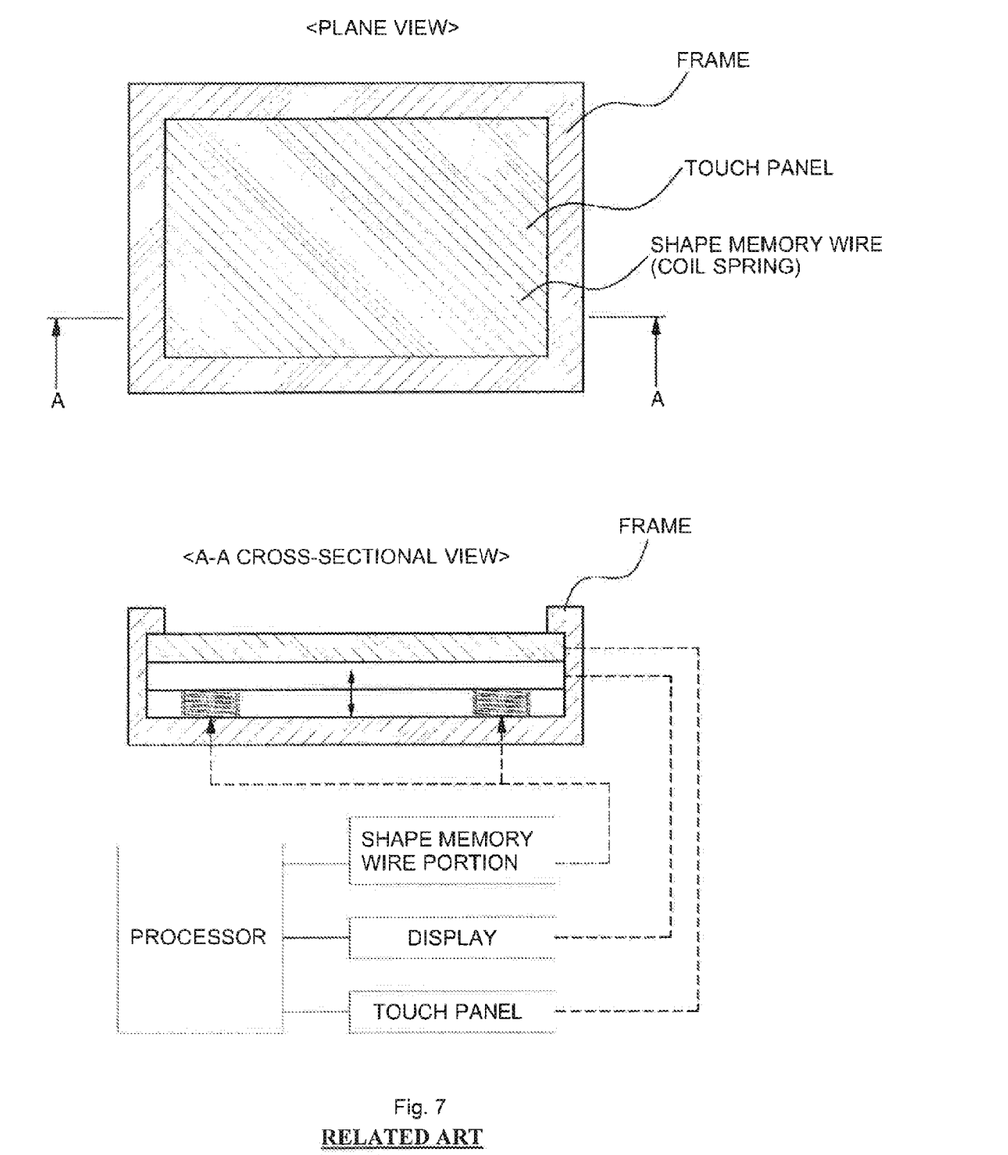
FIG. 7 is a structural diagram of a conventional electronic device.

Additionally, the electronic device proposed in Patent Document 1 is shown in FIG. 7. As shown in 7, a shape memory wire in the form of a coil spring is installed at four corners on the bottom inside a frame, and a display and a touch panel are overlaid on the shape memory wires. A processor turns on/off current of the shape memory wires to control expansion and contraction. For example, the shape memory wire may be configured to contract if current flows. In this way, the entire surface of the display and the touch screen is moved. With such a structure, (a) a frame is required to allow the shape memory wire to expand and contract; (b) both of the display and the touch screen are pressed down and then restored; and (c) only an instruction of a single event is valid.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Accordingly, the present invention has been made to solve the foregoing problem, and provides an electronic device which is capable of local deformation and multi-point input and also miniaturization, reduced thickness and an excellent sense of touch.

According to an aspect of the present invention, there is provided an electronic device (touch panel display unit) that includes a touch panel having an X-axis position detecting conductive layer, a Y-axis position detecting conductive layer, and a pressed position detection circuit configured to detect pressed coordinates and a pressing force from a change in capacitances. The electronic device also includes a shape memory wire portion that has a shape-memory-wire first layer deposited on the touch panel in which a plurality of shape memory wires are arranged towards one side, a shape-memory-wire second layer in which a plurality of shape memory wires are arranged orthogonally to the first layer, and an actuator that is configured to restore the shapes of the shape memory wires deformed by flowing current through the shape memory wires of the first layer and the second layer accordingly. In addition, the electronic device also has a display (e.g., screen) that is configured to display a normal image and a corrected image, as well as a processor that is configured to transmit a normal image held in a memory device to the display, receive the pressed coordinates and pressing force from the touch panel and store the pressed coordinates and the pressing force in the memory device, generate a corrected image at the pressed position based on the pressing force and transmit the corrected image to the display, and instruct the actuator to conduct current through the shape memory wires whose shapes are to be restored.

The shape memory wires of the shape-memory-wire first layer and the shape-memory-wire second layer may be arranged in a latticed pattern, and the X-axis position detecting conductive layer and the Y-axis position detecting conductive layer may be arranged on the lattice in a zigzag pattern when viewed from top.

The processor may also be configured to instruct the actuator to restore a shape of a portion deformed by pressing for an arbitrary amount of time based the amount of force that is applied at a particular position on the touch panel.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

DETAILED DESCRIPTION

Hereinafter, an electronic device according to an exemplary embodiment of the present invention will be described in detail with reference to the accompanying drawings to allow those of ordinary skill in the art to easily carry out the present invention. While the invention will be described in conjunction with the exemplary embodiment, it will be understood that present description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, the control logic of the present invention may be embodied as non-transitory computer readable media on a computer readable medium containing executable program instructions executed by a processor, controller or the like e.g., within the MCU 14 and the IPS device 12. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Although the below exemplary embodiment is described as using a single controller/processor to perform the above process, it is understood that the above processes may also be performed by a plurality of controllers/processors.

Figure 1:
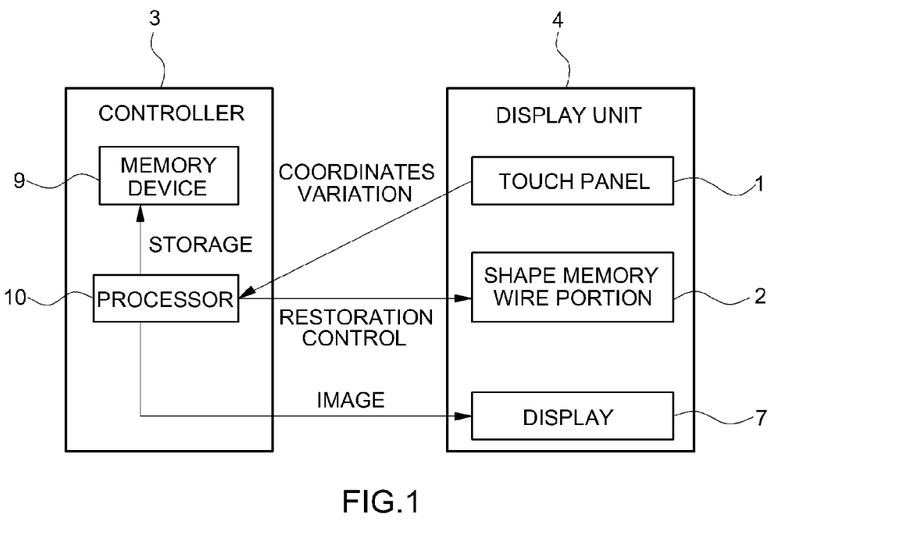
FIG. 1 is a block diagram showing a basic schematic structure of the control mechanism associated with the exemplary embodiment of the present invention.

1 is a block diagram showing a basic schematic structure of the control mechanism associated with the exemplary embodiment of the present invention. As shown in 1, the electronic device according to the present invention includes a controller and a display unit. In the controller 3 is installed a processor 10 and a memory device 9. The display unit 4 includes a touch panel 1, a shape memory wire portion 2, and a display 7 (e.g., a liquid crystal display (LCD) or light emitting diode (LED) screen). The touch panel 1 has a separate circuit for screening the pressing position of the touch panel embedded therein, calculates coordinates pressed and a pressing force by a finger, etc., and outputs the calculated coordinates and a pressing force to the processor 10.

The shape memory wire portion 2 includes a shape-memory-wire first layer 2a in which a plurality of shape memory wires are arranged toward one side, a shape-memory-wire second layer 2b in which a plurality of shape memory wires are arranged orthogonally to the first layer 2a, and an actuator 2c which restores the shapes of the shape memory wires deformed by current flowing to the shape memory wires of the first layer 2a and the second layer 2b. The memory device 9 in the controller 3 stores the pressed coordinates and a pressing force of e.g., a finger coming in contact with the display unit 4. The memory device 9 typically also stores a plurality of images as well.

The processor 10 in the controller 3 is configured/programmed to transmit a normal image held in the memory device 9 to the display 7, receive one or more pressed coordinates and the pressing force from the touch panel 1 and store the pressed coordinates and pressing force in the memory device 9. The process is also configured to generate a corrected image at a pressed position based on the pressing force and transmits the generated image to the display 7, and instructs the actuator 2c of the shape memory wire portion 2 to conduct a shape memory wire whose shape is to be restored. The display 7 displays the corrected image or the normal image.

Figure 2:
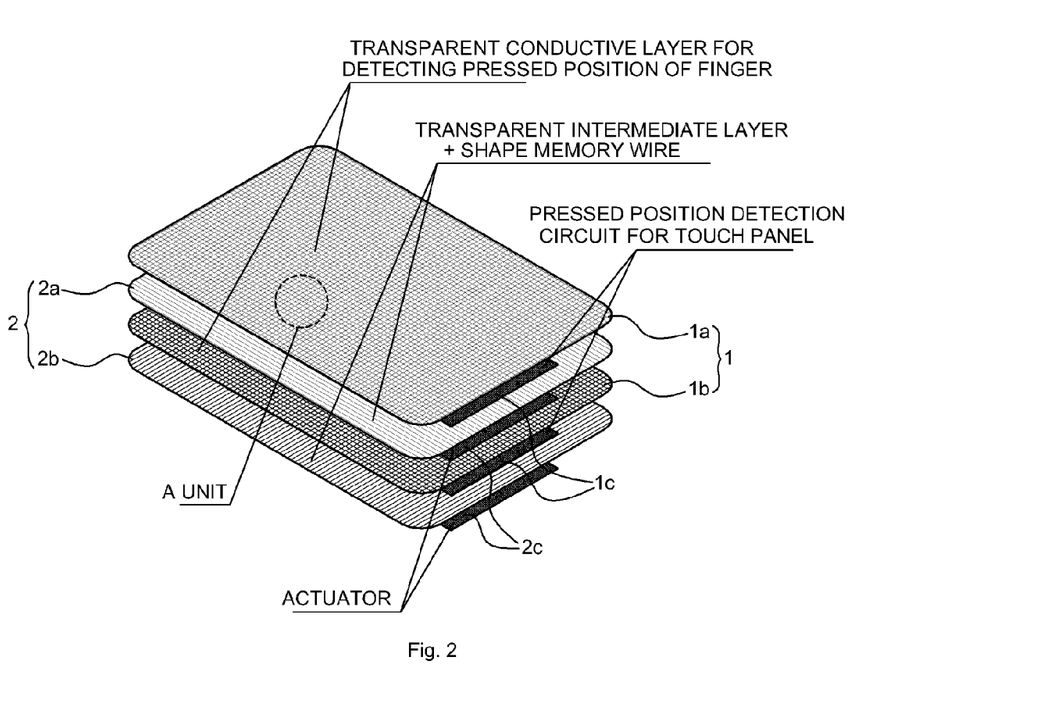
FIG. 2 is a descriptive diagram of a shape memory wire portion and a touch panel shown in FIG.1.

2 is a descriptive diagram of the shape memory wire portion 2 and the touch panel 1 shown in 1. From top to bottom in 2, four layers, that is, a transparent conductive layer 1a for detecting an X-axis position, the shape-memory-wire first layer 2a, a transparent conductive layer 1b for detecting a Y-axis position, and the shape-memory-wire second layer 2b are deposited. The X-axis position detecting transparent conductive layer 1a and the Y-axis position detecting transparent conductive layer 1b are connected to a pressed position detection circuit 1c. The shape-memory-wire first layer 2a and the shape-memory-wire second layer 2b are connected to the actuator 2c.

Figure 3A:
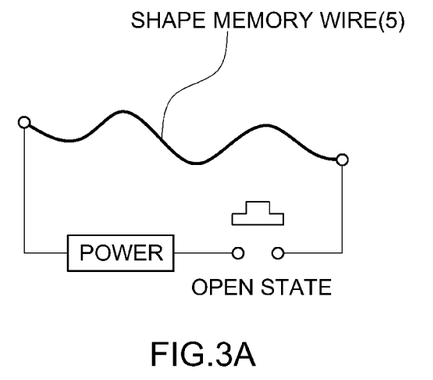
FIGS. 3A-C is a descriptive diagram showing a change in the shape of a shape memory wire.
Figure 3B:
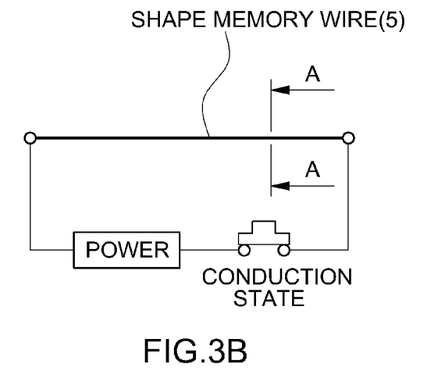
Figure 3C:
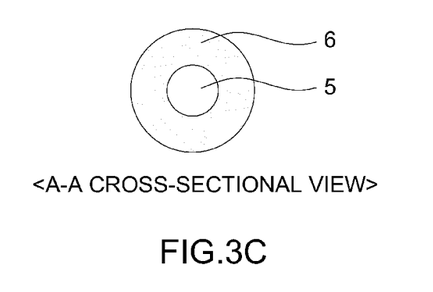

FIGS. 3A-C is a descriptive diagram showing a change in the shape of a shape memory wire 5. Generally, the shape memory wire 5, as shown in 3A, illustrate a state in which the power is not connected. For this reason, the shape memory wire 5 is deformed when a finger touches or presses on the touch panel. Such deformation improves the sense of touch when compared to pressing on a hard flat inflexible surface.

Once the processor 10 instructs the actuator 2c to provide current therein to reform the shape memory wire 5 back into its designated shape, the shape memory wire 5 returns to its designated shape (e.g., flat) as shown in 3B. That is, the shape memory wire 5 is powered up and thus is restored to its original shape. That is, wires manufactured using Ti—Ni, etc., have the shape memory effect (SME) of emitting heat thereby restoring the original shape as the current flows thereon. A cross-section of the shape memory wire 5 may be covered with a transparent elastic material 6 around its circumference, as shown in FIG. 3C. Without being limited to the foregoing example, a plurality of shape memory wires 5 may also be inserted between transparent elastic material 6 in the shape of two separate sheets.

Figure 4:
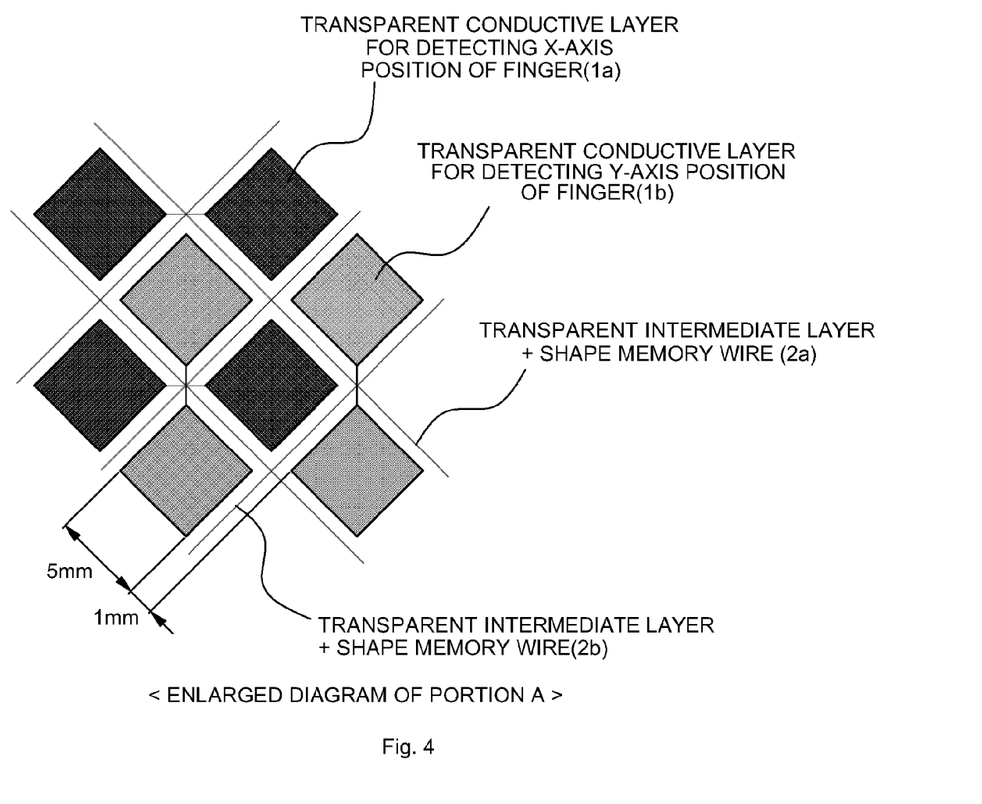
FIG. 4 is an enlarged diagram of a portion A shown in FIG. 2, viewed from top.

4 is an enlarged diagram of a portion A shown in 2, viewed from top. The shape memory wires 5 of the shape-memory-wire first layer 2a and the shape-memory-wire second layer 2b are arranged to be orthogonal to each other, that is, in a latticed manner. At least one side of the lattice may be about 5 mm, and the interval between conductive layers may be about 1 mm. Corresponding to the lattice, the X-axis position detecting transparent conductive layer 1a and the Y-axis position detecting transparent conductive layer 1b may be arranged in a zigzag pattern when viewed from above. The X-axis position detecting transparent conductive layer 1a or the Y-axis position detecting transparent conductive layer 1b may be an element whose capacitance is changed when the element is touched by, e.g., a finger.

Figure 5:
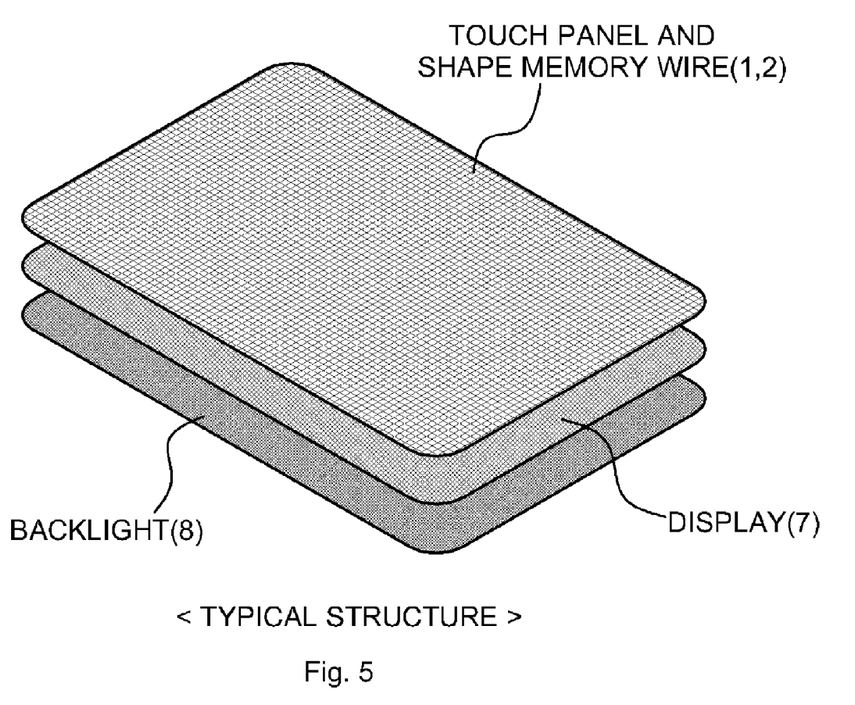
FIG. 5 is a diagram showing a structure of an electronic device according to an exemplary embodiment of the present invention.

5 is a diagram showing a structure of the electronic device/touch panel display unit according to the exemplary embodiment of the present invention. As shown in 5, the shape memory wire portion 2 is embedded in the touch panel 1. Under the touch panel 1 is disposed the display 7 under which a backlight unit 8 is disposed. For effectiveness of deformation of the shape memory wire portion 2, a predetermined interval is preferably provided between a layer of the touch panel 1 and the shape memory wire portion 2 and a layer of the display 7. When a self-light-emitting element such as an organic electroluminescence (EL) element is used, the display 7 may have a spherical surface or a convex surface.

Figure 6:
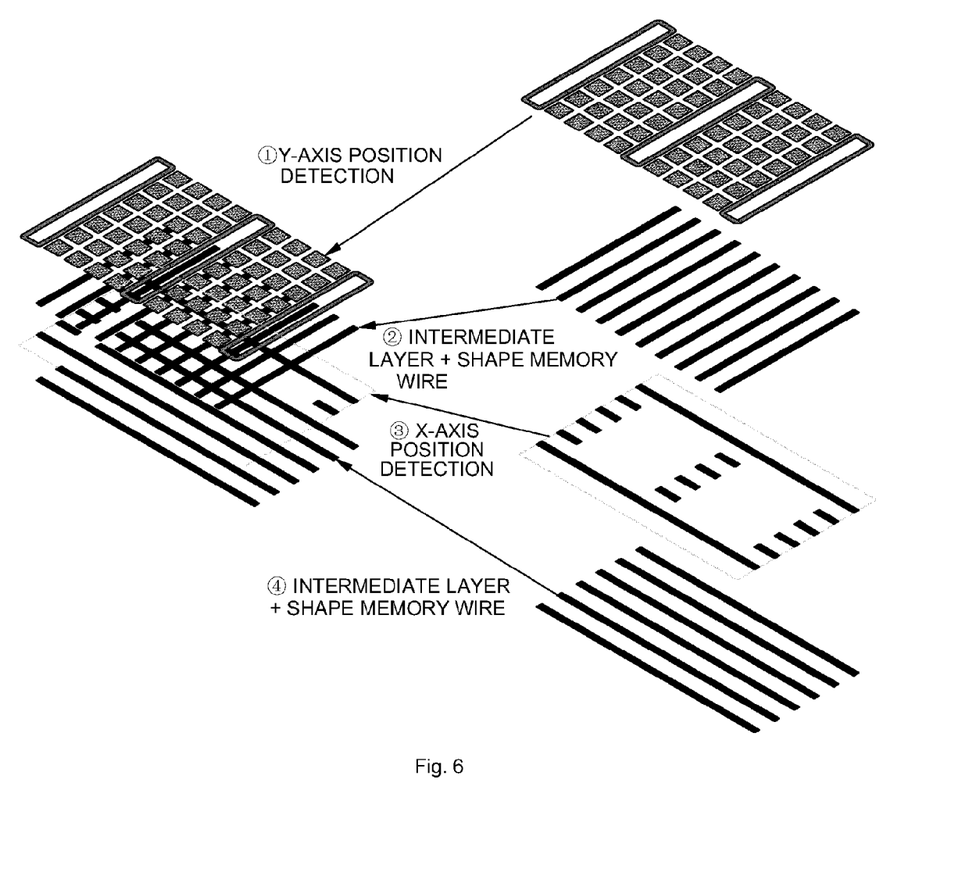
FIG. 6 is a diagram showing a detailed structure of a touch panel including a shape memory wire shown in FIG. 5.

6 is a diagram showing a detailed structure of the touch panel 1 including the shape memory wire portion 2 shown in 5. As shown in 6, a bottom layer in which intermediate layers and the shape memory wires 5 are arranged in an X-axis direction; a layer of an X-axis position detecting transparent conductive layer; a layer in which an intermediate layer and the shape memory wires 5 are arranged in a Y-axis direction; and the Y-axis position detecting transparent conductive layer are sequentially deposited from bottom to top.

According to the present invention, by disposing shape memory wires in a latticed pattern, local pressing is possible. Thus, for example, a plurality of buttons may be displayed, a position corresponding to each button may be pressed, a pressed portion may be locally deformed, and the sense of touch can be improved. That is, application to a touch panel capable of multi-point input is possible. Even when the shape memory wire is deformed by pressing, the touch panel can be restored to its original shape by current flowing therethrough, thereby maintaining a contact surface of the touch panel. The shape memory wire does not extend in a vertical direction like a coil spring, and is arranged on a surface, thereby achieving miniaturization and reduced thickness. The processor generates a corrected image based on a pressing force of each point, thus preventing a distorted image from being displayed on the display while still allowing the user to feel or sense the screen actually being touched.

The shape-memory-wire first layer and second layer may also be arranged in a latticed pattern, and the X-position detecting transparent conductive layer and the Y-axis position detecting transparent conductive layer may be arranged in a zigzag pattern on the lattice, when viewed from above, to prevent detection of capacitances of the first layer and the second layer from overlapping. In addition, precision of a pressed position of a finger, etc., can be guaranteed.

Moreover, the processor may control shape restoration of a portion deformed by pressing the actuator for an arbitrary amount of time based the amount of force that is applied at a particular position on the touch panel, thereby rapidly restoring the shape of the shape memory wire. In particular, the arbitrary amount of time is the amount of time it takes to change from on job application using the display to another.

[Description of Reference Numerals]

| | |
|---|---|
| 1: Touch Panel | 1a: X-Axis Position Detecting Transparent Conductive Layer |
| 1b: Y-Axis Position Detecting Transparent Conductive Layer | 1c: Pressed Position Detection Circuit |
| 2: Shape Memory Wire Portion | 2a: First Layer |
| 2b: Second Layer | 2c: Actuator |
| 3: Controller | 4: Display Unit |
| 5: Shape Memory Wire | 6: Transparent Elastic Material |
| 7: Display | 8: Backlight |
| 9: Memory Device | 10: Processor |

What is claimed is:

1. An electronic device comprising:
    a touch panel including an X-axis position detecting conductive layer, a Y-axis position detecting conductive layer, and a pressed position detection circuit to detect pressed coordinates and a pressing force from a change in capacitances;
    a shape memory wire portion including a shape-memory-wire first layer deposited on the touch panel in which a plurality of shape memory wires are arranged toward one side thereof, a shape-memory-wire second layer in which a plurality of shape memory wires are arranged orthogonally to the first layer, and an actuator that is configured to restore shapes of shape memory wires deformed by flowing current through the shape memory wires of the first layer and the second layer accordingly;
    a display configured to display a normal image and a corrected image; and
    a processor configured to transmit a normal image held in a memory device to the display, receive the pressed coordinates and pressing force from the touch panel, store the pressed coordinates and pressing force in the memory device, generate the corrected image at a pressed position based on a location pressing force, transmit the corrected image to the display, and instruct the actuator to apply a current to the shape memory wires whose shapes are to be restored,
    wherein the Y-axis position detecting conductive layer, the shape-memory-wire first layer, the X-axis position detecting conductive layer, and the shape-memory-wire second layer are sequentially deposited from top to bottom.

2. The electronic device of claim 1, wherein in a state where the Y-axis position detecting conductive layer, the shape-memory-wire first layer, X-axis position detecting conductive layer, and the shape-memory-wire second layer are sequentially deposited from top to bottom, the shape memory wires of the shape-memory-wire first layer and the shape memory wires of the shape-memory-wire second layer are arranged in a latticed pattern, and the X-axis position detecting conductive layer and the Y-axis position detecting conductive layer are arranged on the lattice in a zigzag pattern when viewed from above.

3. The electronic device of claim 1, wherein the processor instructs the actuator to restore a shape of a portion deformed by pressing over an arbitrary amount of time based on the amount of force that is applied at a particular position on the touch panel.

4. A non-transitory computer readable medium containing program instructions executed by a processor, the computer readable medium comprising:
    program instructions that transmit a normal image held in a memory device to a display, the display configured to display the normal image and a corrected image received from the processor;
    program instructions that receive one or more pressed coordinates and a pressing force from a touch panel, the touch panel including an X-axis position detecting conductive layer, a Y-axis position detecting conductive layer, and a pressed position detection circuit to detect the one or more pressed coordinates and the pressing force from a change in capacitances;
    program instructions that store the one or more pressed coordinates and the pressing force in the memory device;
    program instructions that generate the corrected image at a pressed position based on a location pressing force;
    program instructions that transmit the corrected image to the display; and
    program instructions that instruct an actuator to apply a current to a shape memory wire portion whose shape is to be restored,
    wherein the shape memory wire portion include a shape-memory-wire first layer deposited on the touch panel in which a plurality of shape memory wires are arranged toward one side thereof, a shape-memory-wire second layer in which a plurality of shape memory wires are arranged orthogonally to the first layer, and an actuator that is configured to restore shapes of shape memory wires deformed by flowing current through the shape memory wires of the first layer and the second layer accordingly, and wherein the Y-axis position detecting conductive layer, the shape-memory-wire first layer, the X-axis position detecting conductive layer, and the shape-memory-wire second layer are sequentially deposited from top to bottom.

5. The non-transitory computer readable medium of claim 4, further comprising program instructions that instruct the actuator to restore a shape of a portion deformed by pressing over an arbitrary amount of time based the amount of force that is applied at a particular position on the touch panel.

6. A method comprising:

transmitting, by a processor, a normal image held in a memory device to a display;

receiving, by the processor, one or more pressed coordinates and a pressing force from a touch panel, the touch panel including an X-axis position detecting conductive layer, a Y-axis position detecting conductive layer;

storing, on the memory device, the one or more pressed coordinates and the pressing force in the memory device;

generating, by the processor, a corrected image at a pressed position based on a location pressing force;

transmitting, by the processor, the corrected image to the display; and instructing, by the processor, an actuator to apply a current to a shape memory wire portion to restore the shape of one or more shape memory wires within the shape memory wire portion, wherein the shape memory wire portion include a shape-memory-wire first layer deposited on the touch panel in which a plurality of shape memory wires are arranged toward one side thereof, a shape-memory-wire second layer in which a plurality of shape memory wires are arranged orthogonally to the first layer, and an actuator that is configured to restore shapes of shape memory wires deformed by flowing current through the shape memory wires of the first layer and the second layer accordingly, and wherein the Y-axis position detecting conductive layer, the shape-memory-wire first layer, the X-axis position detecting conductive layer, and the shape-memory-wire second layer are sequentially deposited from top to bottom.

7. The method of claim 6, wherein the display is configured to display the normal image and the corrected image received from the processor.

8. The method of claim 6, wherein the shape memory wire portion include a shape-memory-wire first layer deposited on the touch panel in which a plurality of shape memory wires are arranged toward one side thereof, a shape-memory-wire second layer in which a plurality of shape memory wires are arranged orthogonally to the first layer, and an actuator that is configured to restore shapes of shape memory wires deformed by flowing current through the shape memory wires of the first layer and the second layer accordingly.

9. The method of claim 6, wherein the touch panel includes an X-axis position detecting conductive layer, a Y-axis position detecting conductive layer, and a pressed position detection circuit to detect the one or more pressed coordinates and the pressing force from a change in capacitances.

10. An electronic device comprising:

a touch panel configured to detect pressed coordinates and a pressing force from a change in capacitances, the touch panel including an X-axis position detecting conductive layer, a Y-axis position detecting conductive layer;

a shape memory wire portion configured to restore its shape of shape memory wires by applying current through one or more shape memory wires of a first layer and a second layer accordingly;

a display configured to display a normal image and a corrected image; and a processor configured to provide a corrected image for a location of the touch panel which is currently being touched and to apply a current to the shape memory wire portion to restore the shape memory wire portion to an original shape, wherein the shape memory wire portion include a shape-memory-wire first layer deposited on the touch panel in which a plurality of shape memory wires are arranged toward one side thereof, a shape-memory-wire second layer in which a plurality of shape memory wires are arranged orthogonally to the first layer, and an actuator that is configured to restore shapes of shape memory wires deformed by flowing current through the shape memory wires of the first layer and the second layer accordingly, and wherein the Y-axis position detecting conductive layer, the shape-memory-wire first layer, the X-axis position detecting conductive layer, and the shape-memory-wire second layer are sequentially deposited from top to bottom.

* * * * *